Patented Aug. 5, 1930

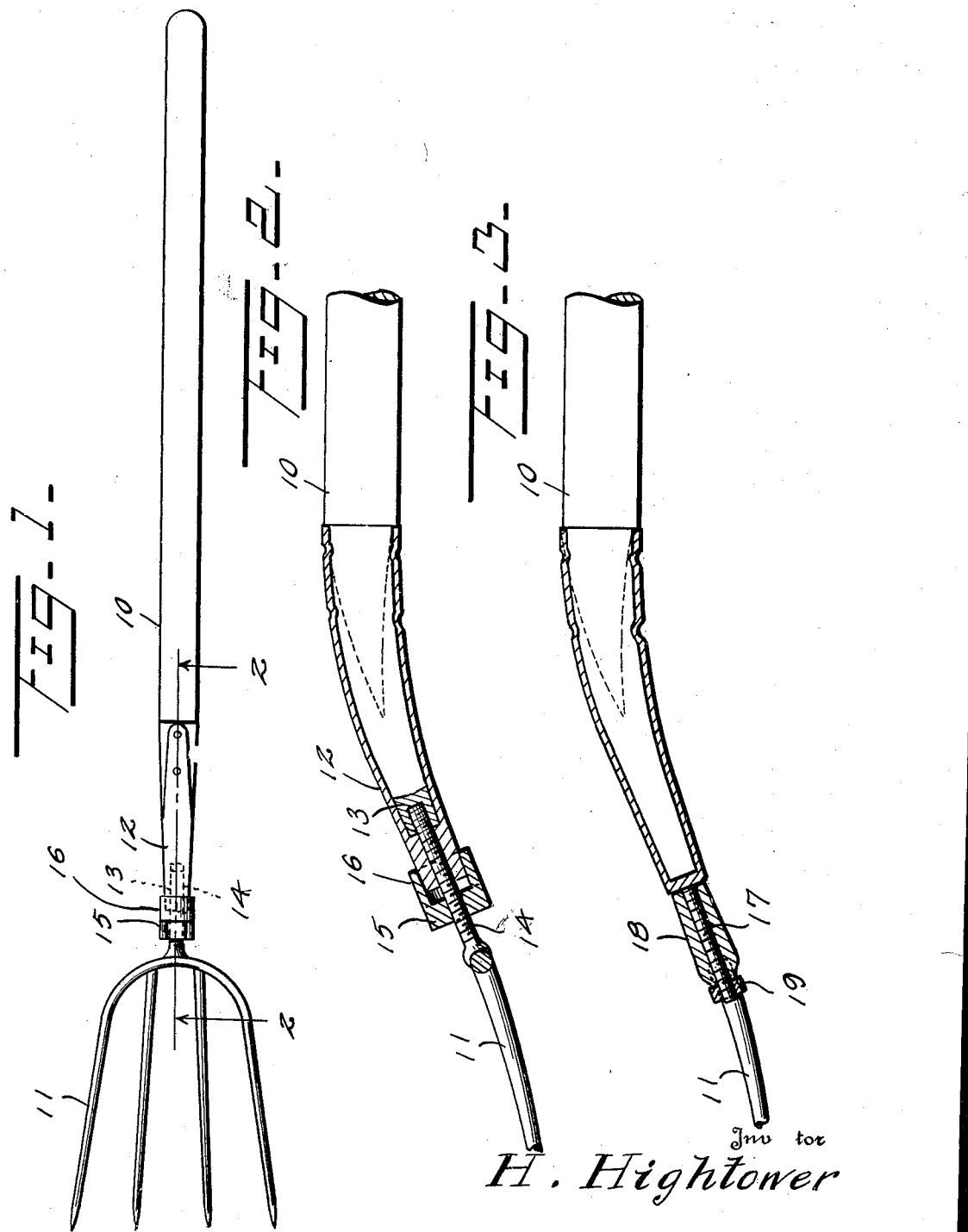

1,772,181

UNITED STATES PATENT OFFICE

HOWARD HIGHTOWER, OF BETHUNE, COLORADO

AGRICULTURAL IMPLEMENT

Application filed April 12, 1928. Serial No. 269,585.

This invention relates to agricultural implements and more particularly to a means for securing the heads of agricultural implements to the handles thereof.

An important object of the invention is to produce a structure such that the head of the implement will be readily held to the handle and will, at the same time, be readily removed to permit replacement of either element of the tool.

A further object of the invention is to provide a device of this character which may be very readily and cheaply constructed and which will be durable and efficient in service.

These and other objects I attain by the construction shown in the accompanying drawing, wherein for the purpose of illustration is shown a preferred embodiment of my invention and wherein:—

Figure 1 is a plan view showing an agricultural implement constructed in accordance with my invention;

Figure 2 is a longitudinal sectional view therethrough;

Figure 3 is a sectional view through a modified construction.

Referring now more particularly to the drawing, the numeral 10 generally designates a tool handle and 11 the head thereof. The handle, in accordance with my invention, is equipped wth a ferrule 12. In Figure 1 of the drawings, this ferrule is shown as formed with a threaded socket 13, while the head 11 is provided with a threaded stem 14 for engagement in this socket. A ferrule tip 15 is provided in the form of a nut having a skirt 16 adapted to embrace the outer end of the ferrule. This nut is placed upon the stem 14, the stem 14 screwed into the socket 13 and when fully seated therein, the nut 15 is tightened. At this time, this nut serves both as a lock nut and as a means for reinforcing the ferrule at the socket end thereof. The rear portion of the stem 14 is engaged in the screw threaded socket 13 of the ferrule 12 and the nut 15 is engaged with the front portion of the stem 14. The axial dimension of the nut 15 and its skirt 16 is approximately equal to the corresponding dimension of the front portion of the stem 14, so that the skirt 16 will be free of engagement with the ferrule 12 when the nut is in its foremost position on the stem and thus prevent the nut and its skirt from interfering with the application of the stem to the socket of the ferrule. After the stem 14 has been engaged with the socket of the ferrule 12, the nut 15 is turned rearwardly on the stem so as to cause its integrally formed skirt 16 to be arranged in frictional engagement with the front end of the ferrule 12. Furthermore, when the nut 15 is adjusted into its foremost position on the stem 14, the stem may be readily turned out of the socket of the ferrule 12 when it is desired to replace the head 11 with another one of the same or different type.

In the form of the invention shown in Figure 3, the ferrule 12 is provided with a threaded shank 17, while the tool head has a threaded socket 18 for the reception of this shank. With a construction of this character, a lock nut 19 is likewise provided and this nut, as shown, may, if so desired, be engaged with the outer end of the stem 17 which is constructed to project through the outer end of the socket 18.

It is pointed out that a structure of this character will provide a ready means for connecting the handles and heads of the tools and will prevent accidental disengagement thereof, such as occurs in the ordinary structure when the stem of the head becomes loosened in the handle. This accidental disengagement is the cause of many accidents, particularly in connection with pitch forks where the loosened head is apt to become separated and fall into machinery which is being fed with the fork.

Since the construction hereinbefore set forth is capable of a certain range of change and modification without materially departing from the spirit of the invention, I do not limit myself to such specific structure except as hereinafter claimed.

I claim:—

A tool comprising a handle, a ferrule secured to the handle, the ferrule being provided with a screw threaded socket and having a tapered outer wall, a head having a stem formed integrally therewith, the stem being screw threaded throughout its entire length and having its rear portion engaged in said socket, and a nut engaged with the front portion of the stem and provided with a skirt formed integrally therewith and extending rearwardly therefrom, the skirt being conical and frictionally embracing the front end of the ferrule, the axial dimension of the nut and its skirt being substantially similar to the corresponding dimension of the front portion of the stem so as to permit the rear portion of the stem to be turned into the ferrule without contact between the skirt and ferrule.

In testimony whereof I hereunto affix my signature.

HOWARD HIGHTOWER.